Dec. 4, 1923. 1,476,674
F. H. HEADLEY
SPRING MOUNTING OF VEHICLE SEATS
Filed Sept. 8, 1919    2 Sheets-Sheet 1
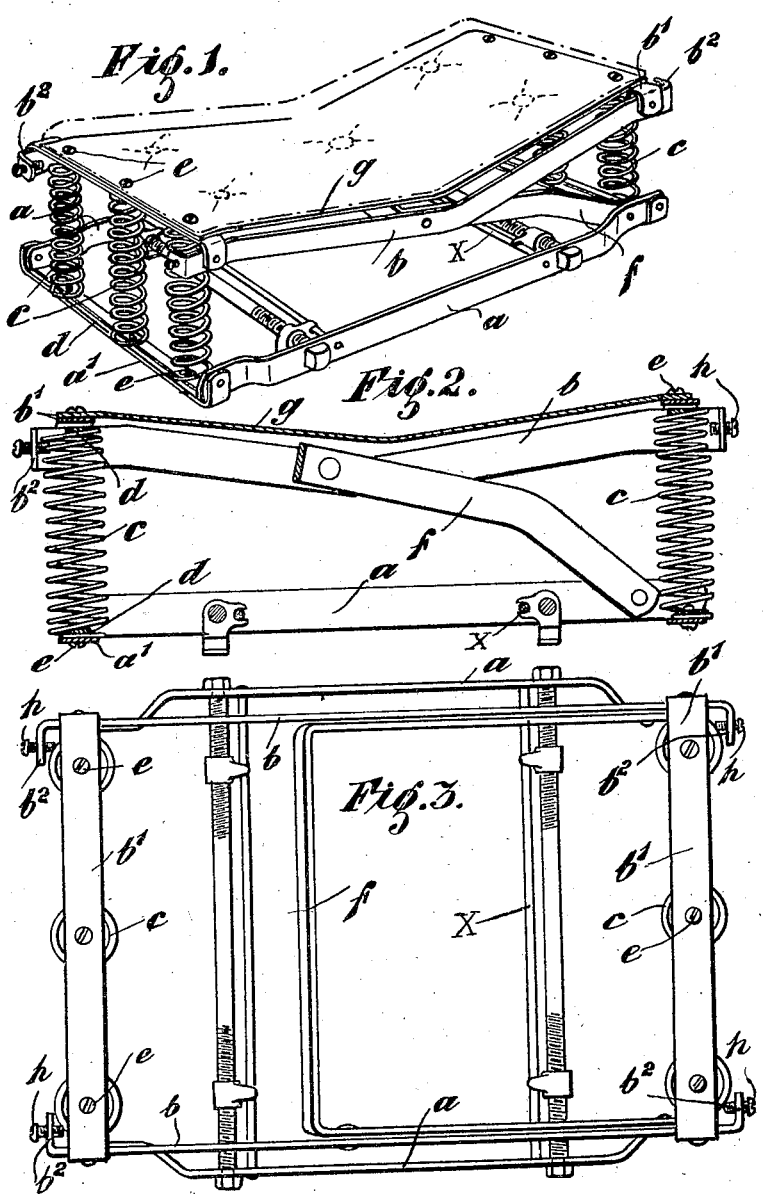

Dec. 4, 1923.
F. H. HEADLEY
1,476,674
SPRING MOUNTING OF VEHICLE SEATS
Filed Sept. 8, 1919          2 Sheets-Sheet 2
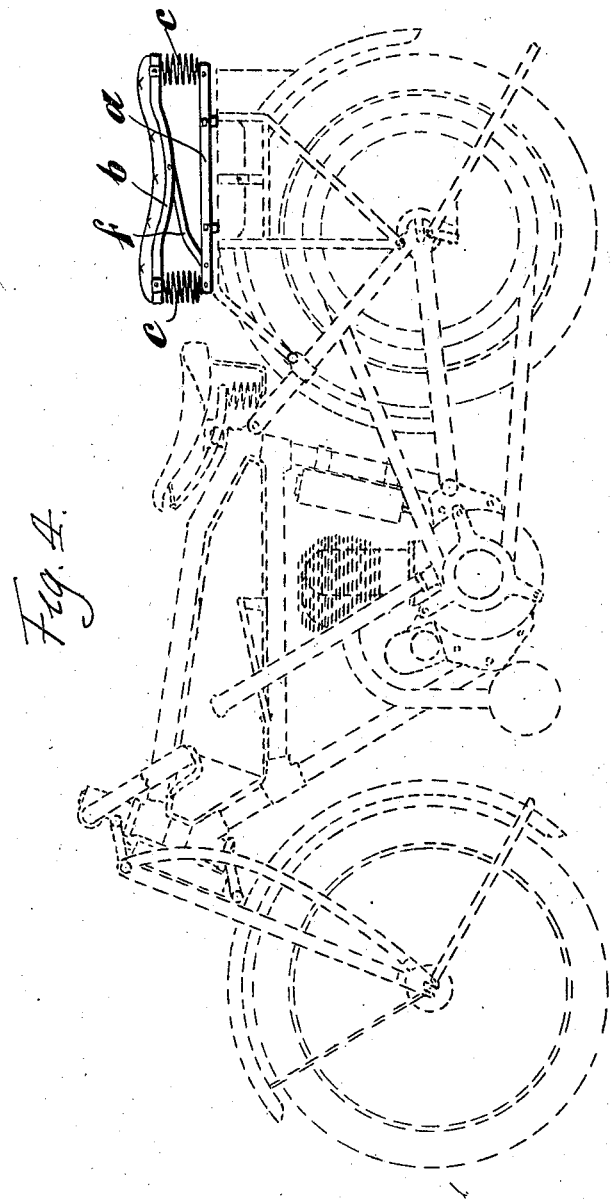

Patented Dec. 4, 1923.

1,476,674

UNITED STATES PATENT OFFICE.

FREDERICK HAGGER HEADLEY, OF BIRMINGHAM, ENGLAND, ASSIGNOR TO TAN SAD LIMITED, OF BIRMINGHAM, ENGLAND, A CORPORATION.

SPRING MOUNTING OF VEHICLE SEATS.

Application filed September 8, 1919. Serial No. 322,507.

*To all whom it may concern:*

Be it known that I, FREDERICK HAGGER HEADLEY, a subject of the King of Great Britain, residing at 65 Stirling Road, Edgbaston, Birmingham, in the county of Warwick, England, manufacturer, have invented certain new and useful Improvements in the Spring Mountings of Vehicle Seats, of which the following is a specification.

This invention relates to the spring mounting of vehicle seats, in which an upper frame is supported from an under frame by springs. The present invention comprises improvements in the springing of such seats, whereby a substantially parallel springing action of said seat is obtained, while at the same time the seat is retained against undue movement in both lateral and longitudinal directions through the medium of a rigid connecting element pivotally connected to the upper and lower frames of the seat. The improvements in the case of pillion seats of motor cycles are of such a nature, as to permit of a seat bottom of sheet metal, thus obviating the necessity of the increased height required for the upholstering of the seat, the seat being also adapted for the ready and alternative attachment of such accessories as a back rest and foot rest in case of the seat being used as a side seat, foot rests and back supports in the case of the seat being used for riding in the jockey position with the addition of a suitable hand grip at either one or both ends, or alternatively with the rear hand grip of a tool box or wallet, all of which are made readily interchangeable.

In order that this invention may be easily understood and readily carried into practice, reference may be had to the appended sheet of drawings, in which:—

Figure 1 is a perspective view of the present invention constructed in the form of a pillion seat.

Figure 2 is a longitudinal section through the seat shown in Figure 1.

Figure 3 is a plan view of the same seat with the bottom removed.

Fig. 4 is a side elevation showing a conventional form of motor cycle in dotted lines and the invention in solid lines and in operative position thereon.

In an embodiment of this invention as applied to a pillion seat, the lower frame of the seat which is adapted to be attached to the luggage carrier is formed of two longitudinal bars $a$ having their broad sides arranged vertically, such bars $a$ being connected together at each end by two lateral bars $a^1$ having their upper faces arranged horizontally and being turned up to a right angle at each end to form flanges which embrace the longitudinal bars $a$, and to which the longitudinal bars are riveted at the respective four corners of the lower frame.

The upper frame is formed of two similar horizontal bars $b$ except that such longitudinal bars are curved slightly downwards at the centre and the transverse bars $b^1$ at each end are turned down to embrace the ends of the longitudinal bars $b$ to which they are riveted.

A plurality of coiled springs $c$ are arranged between the upper and lower transverse bars $b^1$, $a^1$ at each end of the seat, the upper and lower end of such spring $c$ being secured to the respective upper and lower bars by a second strip $d$, which in each case is inserted through the end coils of the spring $c$, which end coils are clamped tightly between the two bars by the insertion of screws $e$ through the frame bars, which screws $e$ are adapted to engage in tapped holes in the strips $d$.

For retaining the upper frame against undesired movement in both a lateral and longitudinal direction a U-shaped member $f$ is provided, the ends of the U being pivoted to the lower longitudinal bars $a$ at points adjacent the one end of the saddle, while the other end of the U-member $f$ is pivoted on each side to the upper longitudinal bars $b$ at a point rearwardly of the centre of the saddle considering for this purpose that the ends of the U-shaped member are pivoted to the lower frame at the front end, the sides of the U-shaped member being slightly bent so as to avoid contact with the lateral bars X provided for securing the seat to the carrier when the seat is laterally depressed under its spring action.

The seat bottom $g$ is formed of sheet metal, slightly curved downwards towards the centre of its length, and having its longitudinal edges turned over to avoid the exposed edge of the metal. The seat bottom is secured in position by the same screws $e$ which enter the spring clamping strips $d$.

The ends of the longitudinal bars $b$ of the upper frame are bent over to form inwardly projecting flanges $b^2$ which are each provided with a tapped hole by which bars carrying the seat back, side foot rest, jockey foot rest, hand grip or grips, tool box or wallet are adapted to be attached by suitable screws $h$ which engage with the tapped holes, the flanged projections $b^2$ preferably being bent to a position which is slightly past the right angle, so that when the flanges are drawn up tightly to the bar which supports the accessory, the amount of spring in the flanges $b^2$ forms a locking medium in relation to the attachment screw $h$ in each case. Pivotal parts of the saddle are all substantially riveted so as to obviate any possibility of becoming disengaged by the pivotal action.

What I claim as my invention, and desire to secure by Letters Patent is:—

1. A spring seat for vehicles and the like, comprising a lower frame, an upper frame, vertically arranged coiled springs between the ends of said frame, and a connecting and bracing member also arranged between said frames, said member having one end pivotally connected to the lower frame at a point near one end of the latter and having the opposite end pivotally connected to the upper frame at a point near but beyond the center thereof with relation to the pivot point of said connecting and bracing member in the lower frame, the axes of the pivotal connections being relatively fixed.

2. A spring seat for vehicles and the like, comprising a lower frame, an upper frame comprising a pair of side bars and a pair of end bars connecting the side bars and having downturned end portions secured thereto, said side bars having inwardly turned end portions and attaching screws mounted in said end portions, and springs between the frames, and yieldingly supporting the upper frame, the upper and lower ends of said springs being secured to said frames.

In witness whereof I have hereunto set my hand.

FREDERICK HAGGER HEADLEY.